United States Patent [19]

Shuey

[11] Patent Number: 4,766,414

[45] Date of Patent: Aug. 23, 1988

[54] POWER LINE COMMUNICATION INTERFERENCE PREVENTING CIRCUIT

[75] Inventor: Kenneth C. Shuey, Raleigh, N.C.

[73] Assignee: Westinghouse Electric Corp., Pittsburgh, Pa.

[21] Appl. No.: 875,154

[22] Filed: Jun. 17, 1986

[51] Int. Cl.$^4$ .......................... H04B 3/56; H04B 3/54
[52] U.S. Cl. ............................. 340/310 A; 340/310 R
[58] Field of Search ............ 340/310 R, 310 A, 825.5; 455/58, 80, 78; 375/36; 333/12, 176, 177; 323/361

[56] References Cited

U.S. PATENT DOCUMENTS

| | | | |
|---|---|---|---|
| 2,385,673 | 9/1945 | Woodworth | 340/310 A |
| 3,846,638 | 11/1974 | Wetherell | 340/310 R |
| 4,032,911 | 6/1977 | Melvin . | |
| 4,065,763 | 12/1977 | Whyte et al. . | |
| 4,130,874 | 12/1978 | Pai . | |
| 4,142,178 | 2/1979 | Whyte et al. . | |
| 4,188,619 | 2/1980 | Perkins | 340/310 R |
| 4,254,402 | 3/1981 | Perkins | 340/310 R |
| 4,355,303 | 10/1982 | Phillips et al. . | |
| 4,379,284 | 4/1983 | Boykin . | |
| 4,427,968 | 1/1984 | York . | |
| 4,467,314 | 8/1984 | Weikel et al. . | |
| 4,573,170 | 2/1986 | Melvin et al. . | |
| 4,602,240 | 7/1986 | Perkins et al. | 340/310 R |

FOREIGN PATENT DOCUMENTS 2461564  7/1976  Fed. Rep. of Germany ... 340/310 R

OTHER PUBLICATIONS

IEEE Transactions on Power Delivery, No. 7, 1/87, K. W. Whang.

Primary Examiner—John W. Caldwell, Sr.
Assistant Examiner—Edwin C. Holloway, III
Attorney, Agent, or Firm—G. Hawzanko

[57] ABSTRACT

A tuned circuit is provided for connection to a transmitter of a power line communication system. The tuned circuit comprises components selected to provide a low impedance path to ground for a power line communication signal of a preselected frequency. When the transmitter is not in the process of transmitting a power line communication signal, it causes a shorting switch to be closed which shorts a secondary winding of a transformer of the tuned circuit. Therefore, during periods of time when the transmitter is not transmitting power line communication signals, spurious signals on the power line are diverted to ground and not permitted to travel to remote receivers connected to the power line distribution system.

3 Claims, 2 Drawing Sheets

POWER LINE COMMUNICATION INTERFERENCE PREVENTING CIRCUIT

BACKGROUND OF THE INVENTION

Electric utility companies utilize power line communication systems to provide a means for a central station to communicate command signals to remote receivers which are located at the sites of electric energy consumers. In some applications of power line communication systems, the remote receivers are configured as one-way devices which are able to receive commands from the central station and follow those commands which are, typically, instructions to shed a predetermined electrical load, such as a water heater or other nonessential devices, during periods of time when the electric utility experiences peak load demands. Power line communication systems can also be utilized in association with two-way remote devices which can also transmit information from the location of an electric energy consumer to the central station. These types of devices can be used to transmit electric energy consumption information or other types of data.

In either a one-way or a two-way power line communication system, a central station formulates a base band data message according to a preselected protocol. This message can be a command, intended to receipt by a remote receiver, to shed nonessential loads or to respond with a subsequent transmission containing data relating to information that is stored at the remote location. After the central station formulates the message in the form of base band data, the base band data bits are then used to modulate a high frequency signal. Although many different high frequency signals can be utilized in this type of system, a typical frequency is 12.5 kilohertz. The modulated signal is then imposed on a power line that is connected to both the central station and the remote receivers to which the message is directed. When a remote receiver detects the presence of an incoming message on the power line, it demodulates the message and examines the base band bits contained therein.

In a typical application, each remote receiver is provided with a unique address and, furthermore, groups of remote receivers are provided with block addresses. This permits the electric utility to address each receiver individually when required or, alternatively, to send a command message to an entire group of receivers simultaneously. When the central station wishes to command a remote receiver to read its own meter values and respond with a return transmission back to the central station containing this data, individual addressing is utilized. However, if the central station wishes to cause a group of remote receivers to shed their loads during a peak demand period, block addressing is used.

When a remote receiver detects that an incoming power line communication message is present on the power line, it detects the message and demodulates it. Once demodulated, the message can be examined by the remote receiver to determine whether or not the message contains its proper individual address or block address. In this way, the remote receiver can determine whether the message is addressed to it or to other remote receivers. If neither the block address nor the individual address contained in the message applies to the remote receiver, the message is ignored.

U.S. Pat. No. 4,065,763, which issued to Whyte et al. on Dec. 27, 1977, discloses a distribution network power line communication system and U.S. Pat. No. 4,142,178, which issued to Whyte et al. on Feb. 27, 1979, discloses a high voltage signal coupler that is used in a distribution network power line communication system. When power line communication signals are intended to travel a significant distance on the power line, repeaters are used to receive and retransmit the signals as they travel from the transmitter to the remote receiver. U.S. Pat. No. 4,032,911, which issued to Melvin on June 28, 1977, discloses a signal repeater for use in conjunction with a power line distribution system.

A typical application of a one-way remote receiver that is capable of responding to load shed commands is disclosed in U.S. Pat. No. 4,130,874, which issued on Dec. 19, 1978 to Pai and which describes a load management terminal having plural selectable address formats for a power line communication system. Also, U.S. Pat. No. 4,355,303, which issued on Oct. 19, 1982 to Phillips et al., discloses a receiver for a distribution network power line communication system.

When a remote receiver receives a message on the power line, it must demodulate it to obtain the base band data signal contained therein. Although many types of modulation schemes are known to those skilled in the art, one particular type of modulation technique that is applicable to power line communication systems is a phase shift keyed (PSK) system. U.S. Pat. No. 4,379,284, which issued on Apr. 5, 1983 to Boykin, discloses a coherent phase shift keyed (CPSK) demodulator for use with a power line communication system. A distribution network communication system utilizing flexible message routes is disclosed in U.S. Pat. No. 4,427,968, which issued on Jan. 24, 1984 to York. U.S. Pat. No. 4,573,170, which issued on Feb. 25, 1986 to Melvin et al., discloses an apparatus and method for sampling multiple carrier signals when the receiver is used in conjunction with a three phase power line and U.S. Pat. No. 4,467,314, which issued on Aug. 21, 1984 to Weikel et al., discloses an electric utility communication system with a field insulation terminal and a load management terminal.

As more and more electric utility companies utilize the power lines to communicate with remote receivers, certain problems can be experienced. If two power lines which employ these types of communication systems are connected together, transmitted messages can travel along the power lines to destinations for which they are not intended. This can occur when two independent power line communication systems are contained within a single distribution system or when two distribution systems are contained within the same electric utility grid. Experience indicates that power line communication signals can be received from a transmitter that is over 75 miles away from the effected receiver and, theoretically, power line communication signals could travel in excess of 100 miles. Therefore, although there may be various devices connected to power line systems that can effectively block the transmission of these signals, it is apparent that, when a transmitter transmits a power line communication message, many unintended receivers can possibly receive the transmission. This situation presents two distinct problems. First, a receiver could respond to a command that was not intended for its receipt and shed a load at an inappropriate time. Secondly, a receiver can be occupied in the process of receiving and demodulating a message that was not intended for it and thereby ignore another message that is intended for its receipt and response.

Various techniques are presently being utilized to avoid these problems, but they are not infallible in operation. For example, various different frequencies are used by different power line communication systems. Since each receiver is provided with a demodulator that is designed to receive and demodulate a particular frequency, it will ignore messages of different frequencies. However, the number of applicable frequencies is finite and the possibility exists that two independent power line communication systems will utilize the same frequency. The use of individual and block addressing is helpful in preventing a remote receiver from inadvertently following a command which is not intended for its receipt. However, there is a finite limitation on the uniqueness of individual addresses and, in the case of block addresses, it is likely that different electric utility companies will utilize similar numbering schemes to identify its block addresses. Furthermore, even when addressing schemes can be used to avoid the situation in which a remote receiver inadvertently follows a command intended for another receiver, the interference problem described above still exists. A remote receiver can be occupied during the demodulation of a spurious message and thereby miss the receipt of a message intended for its response.

Therefore, it would be helpful to develop a device that prevents the receipt of power line communication messages by receivers for which the messages were not intended regardless of the block address or individual address contained in the message.

SUMMARY OF THE INVENTION

The present invention relates generally to power line communication systems and, more particularly, to devices that can be used to prevent the receipt of power line communication messages by receivers for which the messages were not intended.

The present invention provides a means for connecting a transmitter in signal communication with a power line system. A transformer, having a primary winding and a secondary winding, is connected between the transmitter and the power line. A means is also provided for electrically tuning the circuit connected between the transmitter and the power line so that it provides a low impedance circuit path between the power line and ground potential for a preselected frequency. The circuit is tuned for the frequency that is used for power line communication message intended for receipt by receivers that are associated with the transmitter. For example, if the transmitter and its associated remote receivers utilize a 12.5 kilohertz frequency to be modulated with base band data messages transmitted therebetween, the components of the circuit would be chosen to provide a tuned circuit that is tuned for 12.5 kilohertz. The present invention also provides a means for shorting the secondary winding of the transformer during time periods when the transmitter is not being utilized to transmit messages.

In operation, the transmitter used in association with the present invention will maintain the shorted secondary of the transformer during periods when it is not transmitting messages. Immediately prior to the transmission of power line communication signals, the transmitter opens the shorting means, or switch, and transmits its signals by imposing the modulated messages on the secondary winding of the transformer. Immediately after completing the transmission, the transmitter closes the shorting switch that shorts the secondary winding of the transformer. The components of the tuned circuit are chosen so that, in combination with the primary winding of the shorted transformer, they provide a low impedance circuit path between the power line and ground for the frequency of its modulated messages. During periods of time when the transmitter is not transmitting, any modulated signals appearing on the power line between the transmitter and its remote receivers will experience a low impedance path to ground and will be diverted away from the remote receivers. During periods when the transmitter is not transmitting, any spurious signals that emanate from a distant transmitter will therefore be diverted away from the remote receivers and inadvertent receipt of these transmissions by the remote receivers will be avoided. When the secondary winding of the transformer is shorted, by a shorting switch, no signals of the prescribed frequency can travel on the power line to the remote receivers since these signals will be diverted to ground through the tuned circuit of the present invention.

BRIEF DESCRIPTION OF THE DRAWINGS

The present invention will be more fully understood from a reading of the description of the preferred embodiment in conjunction with the drawing, in which.

DESCRIPTION OF THE PREFERRED EMBODIMENT

The present invention relates generally to power line communication systems and, more particularly, to a device for blocking interference signals from traveling on the power line to remote receivers when the signals are transmitted by other than a preselected transmitter.

Figure 1:
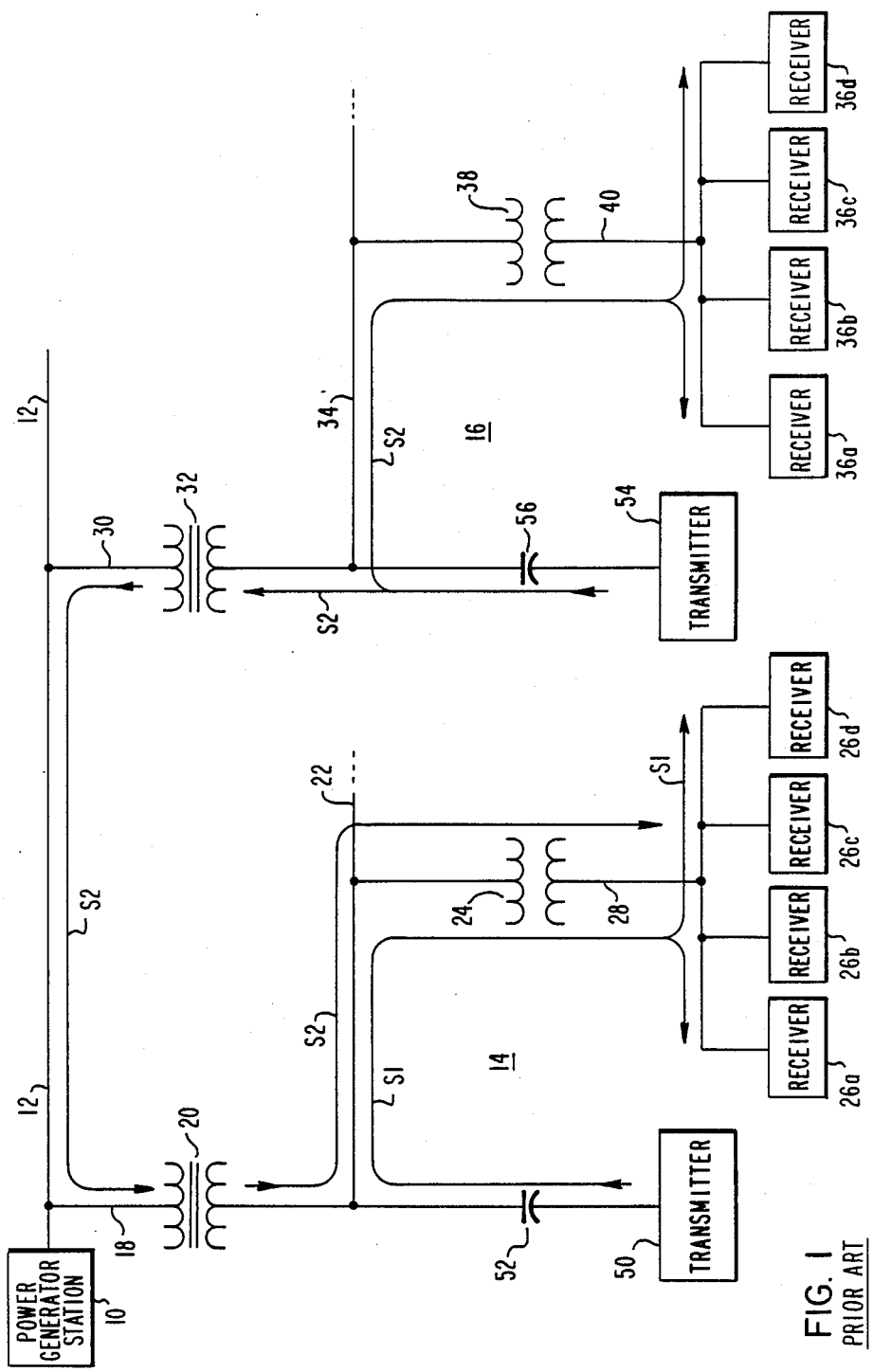
FIG. 1 illustrates an exemplary power line system with two transmitters and a plurality of remote receivers.

FIG. 1 illustrates a portion of a typical power line system having a power generation station 10 connected to a transmission line 12. In FIG. 1, two distribution systems are illustrated. A first system 14 receives its power from the transmission line 12, along line 18, through a step down transformer 20 and along distribution feeder 22. The bus voltage delivered to feeder 22 is further stepped down by transformer 24 for a plurality of remote consumer locations, 26a-26d, which are connected to line 28.

Similarly, a second distribution system 16 is connected to the transmission line 12 through line 30, step down transformer 32 and feeder 34. A plurality of consumer locations, 36a-36d, are connected to the distribution feeder 34 by another step down transformer 38 and line 40 as illustrated in FIG. 1.

It should be understood that other consumer locations would typically be connected to the feeder 22 in distribution system 14 and, similarly, other consumer locations would be connected to the feeder 34 of distribution system 16 as indicated by the dashed extension line of lines 22 and 34. Furthermore, it should be understood that each of the consumer locations (i.e. 26a-26d and 36a-36d) is provided with a receiver for the purposes of receiving signals transmitted by its associated transmitter. For example, transmitter 50 is connected to distribution line 22 by a coupling capacitor 52 and can therefore transmit messages to its associated remote receivers at locations 26a–26d. These transmission signals S1 would be imposed on the power line by the transmitter 50 through coupling capacitor 52 and are intended to pass along the feeder 22, through transformer 24 and on line 28 to the remote receivers at locations 26a–26d. Similarly, in the second distribution system 16, a transmitter 54 is coupled to distribution line 34 by a coupling capacitor 56 for the purposes of transmitting signals to remote receivers located at locations 36a–36d. These signals S2 are intended to travel through the coupling capacitor 56, along the feeder 34, through transformer 38 and on line 40 to the remote receivers at locations 36a–36d. In this manner, transmitter 50 can communicate its command signals to its associated receivers at locations 26a–26d and transmitter 54 can transmit its command signals to its associated remote receivers at locations 36a–36d.

As described above, problems can exist when two distribution systems, such as distribution systems 14 and 16, are connected to a common transmission line, such as line 12 in FIG. 1. An exemplary problem is illustrated in FIG. 1. A transmitted signal S2 from transmitter 54 is transmitted for the purpose of communicating a command signal to its remote receivers at locations 36a–36d, but that signal S2 also propagates through substation power transformer 32, line 30 and transmission line 12 toward distribution system 14. The signal can then pass through substation power transformer 20 to feeder 22 and then, through transformer 24, to the remote receivers at locations 26a–26d. It must be understood that signal S2 is not intended for receipt by the remote receivers in the first distribution system 14 and any receipt of signal S2 by the remote receivers in distribution system 14 is unintended and could possibly cause deleterious results. For example, the remote receiver at location 26a could possibly have the same individual address as one of the remote receivers in distribution system 16 or the remote receivers at locations 26a–26d could have the same block address as a block of receivers in the second distribution system 16. Even if this coincidence of identification addresses does not occur, the remote receivers at locations 26a–26d could be occupied in the process of demodulating signal S2 while transmitter 50 attempts to transmit its own signal S1 that is intended for receipt by these remote receivers of the first distribution system 14. If this occurs, it is likely that the remote receivers of the first distribution system 14 will ignore signals S1 because they are occupied with the effort of actively demodulating the slightly earlier signal S2 and would normally consider signal S1 to be signal noise.

The function of the present invention is to permit the transmitters, 50 or 54, to block incoming signals from other distribution systems and thus prevent those spurious signals from being transmitted along the power line to its associated remote receivers. For example, transmitter 50 would be equipped with the present invention so that it could block signal S2 from propagating to the remote receivers at locations 26a–26d. In operation, when transmitter 50 is not in the process of transmitting a signal to its remote receivers, it would close a shorting switch that would cause the spurious signal S2 to pass directly from power transformer 20 to ground and therefore not propagate along feeder 22. Therefore, although the signal S2, transmitted by transmitter 54, would likely pass through transformer 32 onto transmission line 12, it would be diverted and not permitted to travel onto feeder 22 and its associated remote receivers.

Figure 2:
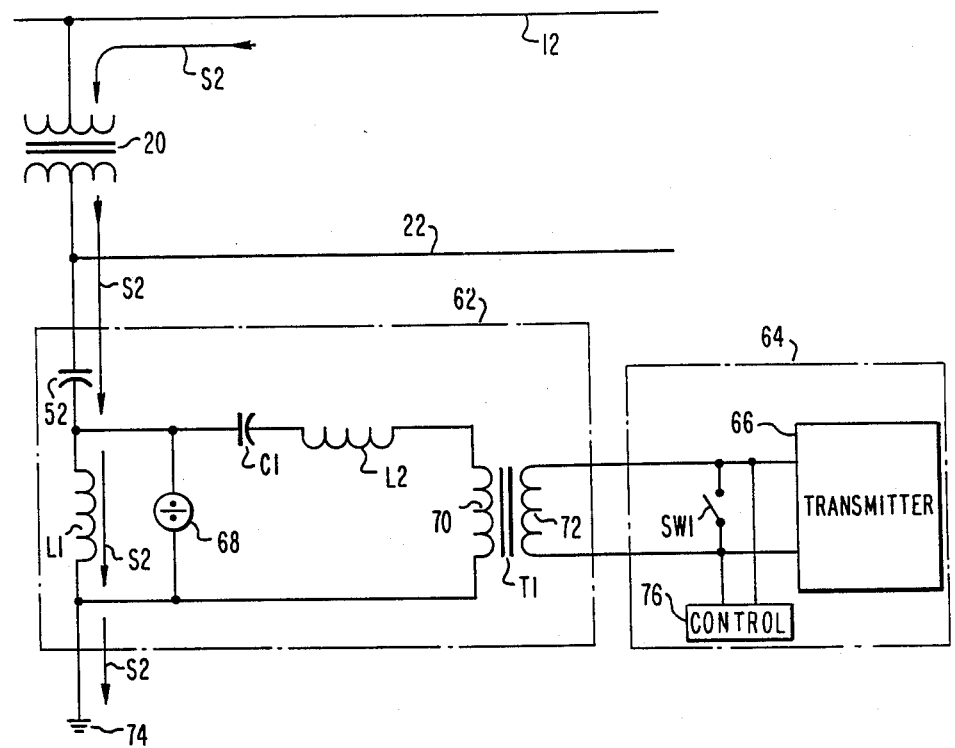
FIG. 2 illustrates the present invention in greater detail along with a transmitter and a portion of a power line.

FIG. 2 illustrates the present invention in greater detail. It should be understood that the portion of the power line system illustrated in FIG. 2 is a portion of the larger segment of the power line system illustrated in FIG. 1. In FIG. 2, the transmission line 12 and its associated substation transformer 20 is shown connected to the feeder 22 in a manner similar to that shown in FIG. 1 of that portion of distribution system 14. Viewing FIGS. 1 and 2 together, it should be understood that the transmitter 50 of FIG. 1 is a simplified illustration of a device which contains both a transmitter portion and a tuned circuit portion. In FIG. 2, the transmitter portion is identified by reference numeral 64 and the tuned circuit portion is identified by reference numeral 62. Both the tuned circuit portion 62 and the transmitter portion 64 are represented, in a simpler form, by the box representing the transmitter 50 in FIG. 1.

The tuned circuit portion 62 of the present invention comprises a drain coil L1 connected to a capacitor C1 and a matching inductor L2. These components, along with a protective gas tube 68, are connected to the primary winding 70 of a transformer T1. Transformer T1 has both a primary winding 70 and a secondary winding 72. The drain coil L1 is connected to ground 74 as shown in FIG. 2. The other end of the drain coil L1 is connected to the feeder 22 by a coupling capacitor 52 which was discussed above in conjunction with the distribution system 14 in FIG. 1.

In the transmitter portion 64 of the present invention, a transmitter 66 is connected to the secondary winding 72 of transformer T1. A switch SW1 is provided and is connected between the termini of the secondary winding 72. Switch SW1 is controlled by the transmitter or a related microprocessor and can be opened or closed on command. Shown in FIG. 2 is a control element 76 which is connected to the transmitter 66 in a manner such that, when a signal is transmitted, the control element 76 is effective for opening switch SW1. When transmitter 66 intends to transmits a message to its related remote receivers, it opens switch SW1 and imposes the modulated signal onto the secondary windings 72 of transformer T1. However, when transmitter 66 is not actively transmitting a message to its remote receivers, switch SW1 is closed and the secondary winding 72 of the transformer T1 is shorted.

When the secondary winding 72 of transformer T1 is shorted by the shorting switch SW1, the tuned circuit 62 provides a low impedance path through coupling capacitor 52 to ground 74 for a particular frequency. Although many different combination of components can be selected to provide a tuned circuit for a particular frequency signal, Table I illustrates an exemplary list of component values used in a preferred embodiment of the present invention for the purpose of providing a tuned circuit with a lower impedance path to ground for a signal of 12.5 kilohertz.

TABLE I

| Reference Numeral | Type or Value |
|---|---|
| C1 | 1 μf, 600 VDC |
| L1 | 7 mh |
| L2 | 430 μh |
| SW1 | Normally closed relay contact |
| T1 | Adjustable-tap matching |

TABLE I-continued

| Reference Numeral | Type or Value |
|---|---|
| 52 | transformer .61 μf, 15 KV |
| 68 | TII 358 |

When switch SW1 is closed and the secondary winding 72 of transformer T1 is shorted, the spurious signal S2 is directed to ground 74 and not along feeder 22. Referring again to FIG. 1, the spurious signal S2 was transmitted by transmitter 54 with the intent of communicating a command message to its related remote receivers at locations 36a–36d, but also propagated through transformer 32, along the transmission line 12, through substation transformer 20 and onto feeder 22. Referring again to FIG. 2, the spurious signal S2 that travels through substation transformer 20 passes directly to ground 74 because of the fact that the tuned circuit portion of the present invention provides an extremely low impedance path to ground 74 and thus prevents the passage of the spurious signal S2 along feeder 22 toward the remote receivers at locations 26a–26d which are illustrated in FIG. 1.

Although the present invention has been particularly described with reference to phase shift keyed (PSK) modulation techniques and an example of a 12.5 kilohertz signal has been used throughout this discussion, it should be understood that many different types of narrow band modulation techniques are suitable for use with the present invention and, furthermore, that the present invention is not limited to use with any particular frequency of signal. The transmitter 66 that is utilized in association with the present invention can be virtually any type of transmitter that is suitable for imposing a signal onto the secondary winding 72 of a transformer T1.

What is claimed is:

1. A power line communication device, comprising:

means for connecting a transmitter in signal communications with a power line, said connecting means comprising a transformer having a first and a second winding, said second winding of said transformer being connected to said transmitter, said first winding of said transformer being connected in signal communication with said power line;

means electrically connected to said connecting means for tuning said connecting means to provide a low impedance circuit path between said power line and ground potential for a preselected frequency signal when said second winding is shorted;

means for shorting said second winding, said shorting means being switchable between a shorting position and a nonshorting position;

said shorting means comprises a switch connected between termini of said second winding, said switch being operable between a first state and a second state, said second state being effective to short said second winding; and means for controlling said switch, said controlling means being associated with said transmitter to short said second winding when said transmitter is not transmitting.

2. The device of claim 1 wherein:

said tuning means comprises an inductive portion and a capacitive portion, said inductive and capacitive portions being asociated together to form a circuit, said circuit being tuned to provide said low impedance path for said preselected frequency signal when said second winding is shorted.

3. The device of claim 1, wherein:

said controlling means is operable to cause said switch to assure said first state when said transmitter is transmitting.

* * * * *